United States Patent Office 3,461,353
Patented Aug. 12, 1969

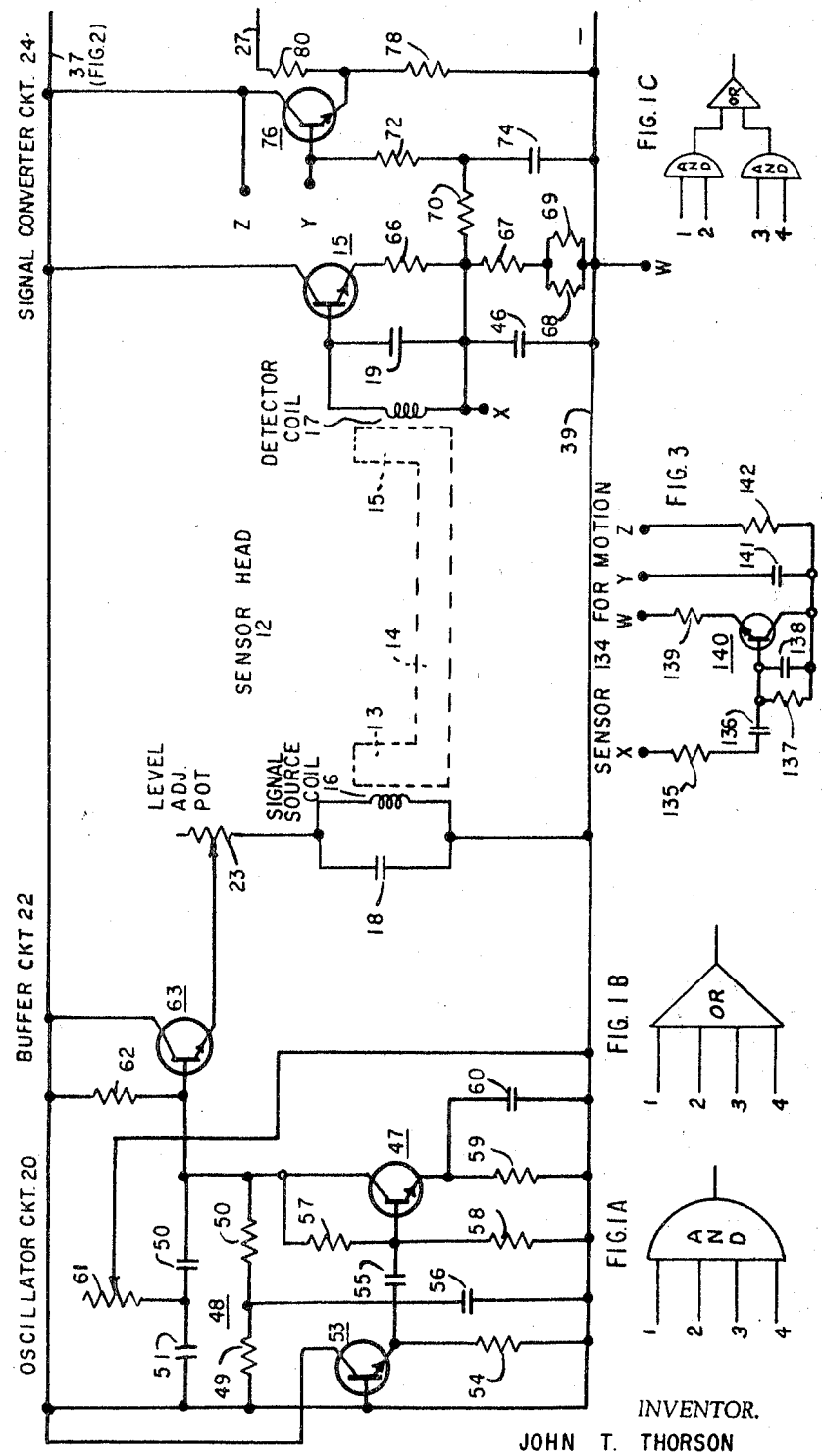

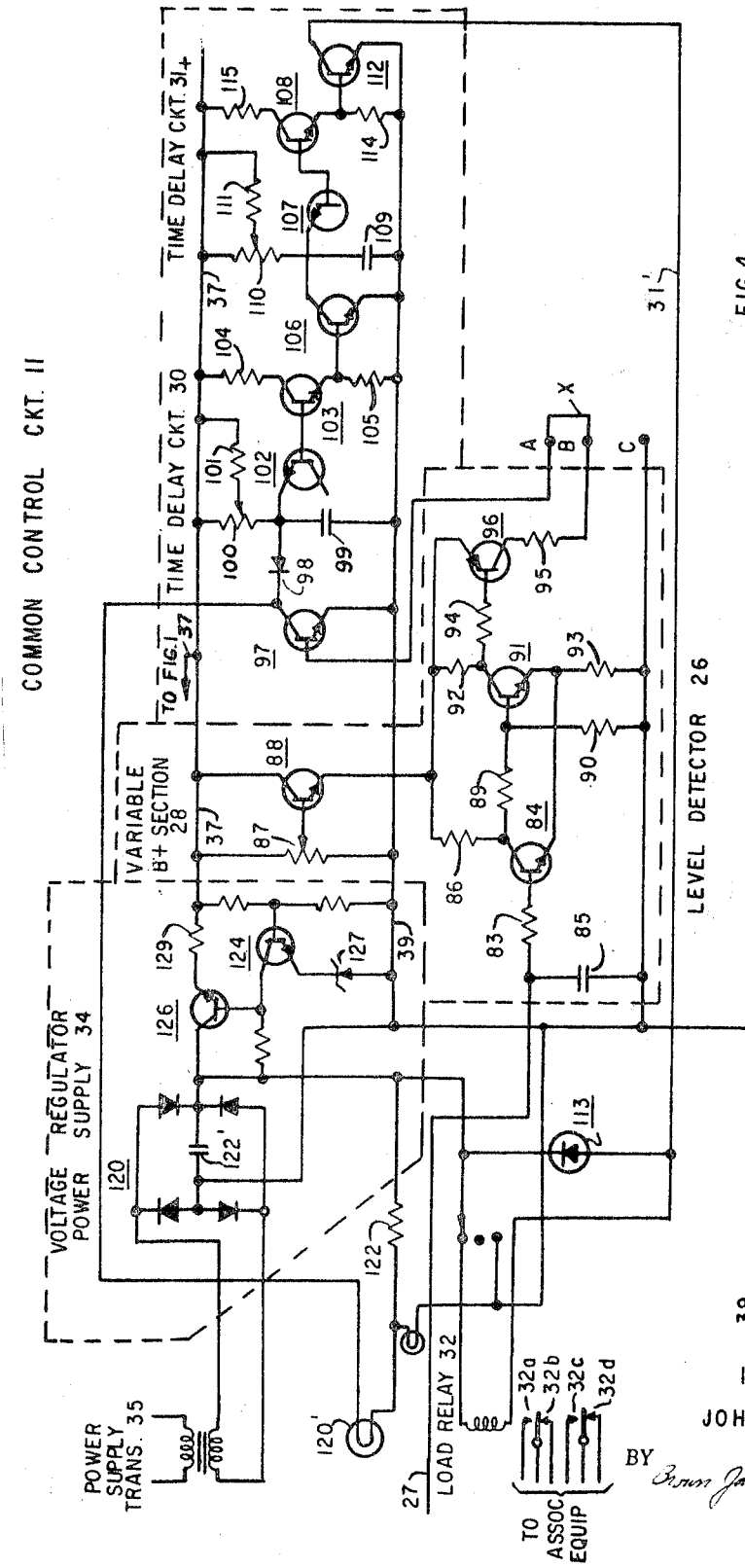

3,461,353
DETECTING UNIT FOR CONDUCTIVE
METAL OBJECTS
John T. Thorson, Chicago, Ill., assignor to Great Lakes
Runway & Engineering Company, Arlington Heights,
Ill., a corporation of Illinois
Filed Nov. 10, 1966, Ser. No. 593,440
Int. Cl. H01h 47/12; G08b 13/00
U.S. Cl. 317—146                                16 Claims

ABSTRACT OF THE DISCLOSURE

A sensing system for use in the detection of metal current-conducting objects comprising a sensor unit including a core member having a first leg with a driven signal coil mounted thereon and a second leg with a detector coil mounted thereon, the two legs being joined by an intermediate section of the core member. The driven signal coil is driven by an oscillator circuit and the detector coil is resonant at the operating frequency of the signal coil. The amplitude of the alternating current output of the detector coil varies with the presence and absence of a metal current-conducting object, and a signal converter provides direct current signals at correspondingly different levels to associated control circuitry which may be variably adjusted to provide void detection, line limit proximity control and proximity motion control for containers on a conveyor line.

---

The present invention is directed to a novel sensing system for use in detecting the presence, absence or motion of a metal object at a predetermined sensing position.

In many industries today material handling systems, such as conveyors, are used to move or advance objects through a plant from position to position for the purpose of having an automatic, or at times manual, operation performed thereon. Since the conveyor and associated equipment are, for the most part, automatic, it is normal to include sensing or monitoring devices in the system for the purpose of detecting a stoppage in the work flow, a change in the movement pattern, or an unexpected accumulation of objects at a particular position.

One of the more frequent uses of such equipment is to be found in food canning companies wherein empty metal cans are fed to different positions by a conveyor line for operations which may include sterilization, filling, processing, sealing, packing and the like. Since the rate of movement of the cans is desirably effected at as high a speed as possible, it is important that any disruption in the assembly line flow be immediately detected, and it is an object of the present invention to provide a novel system which utilizes the current conducting ability of the metal object (rather than a magnetic field) to more reliably detect a change in the flow pattern of the metal objects being moved along the line.

That is, in a number of prior art systems, magnetic field techniques are used for the purpose of sensing the presence of metal objects. While such systems have some utility with ferrous objects, the use of such equipment in installations in which nonferrous objects, such as aluminum, brass and the like, are to be detected, the equipment has proven to be extremely inefficient and unreliable. According to the present invention, a novel sensor unit is provided which operates at a frequency in the order of 400 cycles or higher to provide a first signal level with the presence of a current conducting object, ferrous or nonferrous, adjacent thereto, and a second level output which varies greatly from the first level in the absence of the current conducting object adjacent the sensor unit.

It is a specific object of the present invention to provide a system of such type which has increased flexibility in application to material handling systems. That is, it has been found in the field that different installations may require different sensing capabilities, and accordingly variation in the system to be installed will occur from plant to plant. In some systems, for example, cans may be moved by the conveyor line in "back-to-back" relation, while in other systems the cans must be maintained in a given spaced relation in their movement along the line. In yet other installations, it is only necessary to detect the occurrence of a void in front of a sensor located at a critical position to achieve the desired monitoring of the system operation. It is a specific object of the present invention, therefore, to provide a novel circuit arrangement which may be used in each of these different applications by only simple modification to the basic novel control circuit of the invention.

It is a further object of the present invention to provide a novel sensor unit for use with such device which basically comprises a C-shaped sensor head having a signal source coil mounted on one leg and a detector coil mounted on the second leg, the sensor head being driven so that a signal of maximum value is output in the absence of a metal object adjacent to the head, and a signal of reduced level is provided with a metal object, such as a can, adjacent to the coils. The signal source coil is driven by an oscillator and the detector coil is tuned to resonate only in the absence of a can adjacent thereto, and an associated signal converter circuit provides a voltage level output which is related to the signals provided by the tuned detector coil.

It is yet another object of the invention to provide a sensor unit which detects motion of the metal objects past the device, and which is specifically connected to modify the output of the signal converter to achieve a pulse output at a frequency determined by the rate of flow of the metal objects therepast, and a level determined by the current conductivity charactteristics of the can.

It is yet another object of the invention to provide a single common control circuit for such system which is adapted for simultaneous use with a plurality of sensor units of such type, and a single sensor unit which is operative to simultaneously control a number of common control circuits, whereby increased monitoring is achieved at a minimum of cost in a greatly increased number of different installation modes.

It is a further object of the invention to provide a common control circuit which is so operative, and which includes a first time delay circuit for providing a predetermined measuring period prior to stopping of the operation of the conveyor system, and a second timing circuit for providing a measured time interval prior to automatic restart thereof.

A number of different techniques have been developed in the past in an attempt to find a solution to the problem of reliable monitoring in systems of this type. In certain prior art arrangements a bridge balancing technique has been employed wherein passage of a metal object adjacent to the sensor unit results in unbalance of the bridge to achieve the desired function control. In the use of bridge-type detector circuits in installations requiring a long conductor run between the sensor and the control, the inclusion of more than one head invariably resulted in complex balancing problems and limited the use of such type equipment in the field. Further, bridge-type detector systems are inherently more sensitive to surrounding transient noises, and there is a corresponding increase in the possibility of improper operation in long run installations.

It is a further object of the present invention therefore to provide a system in which the common control circuit includes novel signal level detector means which have a high noise immunity characteristic for minimizing improper operation, and specifically a level detector which, for all practcal purposes, operates only in response to a power pulse (or the absence thereof) to effect the desired control operation, whereby improper operation due to transient noise signals is substantially minimized or eliminated.

It is a specific object of the invention to provide a common control circuit which has a novel level detector arrangement which comprises a Schmitt trigger circuit connected to operate only with receipt of or the absence of a power pulse from the sensor unit.

These and other objects and advantages of the present invention may be best understood by reference to the following description taken in connection with the accompanying drawings, in which:

FIGURE 1 is a circuit diagram of the novel sensor unit of the invention;

FIGURES 1A, 1B and 1C are schematic representations of various embodiments in which a plurality of such sensor units may be connected for use with a single common control circuit;

FIGURE 2 is a circuit diagram of the novel common control circuit of the invention which is used with the sensor unit of FIGURE 1 to control operation of associated equipment;

FIGURE 3 is a sensor circuit for use in one application with the sensor unit of FIGURE 1; and FIGURE 4 is a phase shift stage which is adapted for inclusion in the common control circuit of FIGURE 2 in certain uses of the system.

GENERAL DESCRIPTION

With reference to FIGURES 1 and 2, there is shown thereat a sensor unit (FIG. 1) which may be used to sense the presence, void or motion of a moving current conducting metal objects, and to provide direct current voltage signals of different levels to an associated control circuit 11 (FIG. 2) which in turn may control the operation of associated equipment such as the drive means for a conveyor line and the like. According to a novel feature of the invention, a number of sensor units 10 may be used with the single common control circuit 11 to control the enablement and disablement of associated equipment, the illustrated circuit 11 being competent to handle from one to four sensing heads of the type shown in FIGURE 1, although with a power supply of additional capacity the number of sensing heads can be readily increased.

As will be readily apparent the provision of a common control circuit 11 for a plurality of sensing heads 10 makes possible the provision of an extremely flexible system. With brief reference to FIGURES 1A–1C, "AND" and "OR" gates may be used to connect two or more heads in series equivalent (FIG. 1A), parallel equivalent (FIG. 1B) or an equivalent circuit of both series and parallel (FIG. 1C).

The provision of logic functions which may be performed with a plurality of sensor units while yet using a single amplifier is considered to be a distinguishing feature of the present invention. That is, the coupling of the sensor heads to the amplifier by means of AND/OR gates, produces the same effect as is achieved by series or paralleling mechanical contacts. The use of a single common control circuit with a plurality of heads which supply the amplifier is fundamentally achieved by voltage standardizing of the output of the sensor units 10, such as shown in FIGURE 1, as will be shown in more detail hereinafter.

Yet another advantage of the novel system is the ability to connect two or more heads to control one control circuit and, in fact, to interconnect a number of heads and control circuits in different combinations without experiencing any cross-talk or balancing problems. The desirability of such capability will be readily apparent to parties versed in the art.

With reference once more to FIGURE 1, the sensor unit 10 will be seen to comprise a sensor head including a set of C-shaped core magnet laminates 14 having first and second legs 13, 15 about which a signal source coil 16 and a detector coil 17 are respectively wound. Capacitors 18 and 19 are mounted across coils 16 and 17 respectively to provide tuned circuits and resonance of the coils 16, 17 as will be shown.

A highly stable oscillator and amplifier circuit 20, provides output signals over buffer circuit 22 and level adjustment potentiometer 23 to the signal source coil 16. Capacitor 18 is connected across coil 16 to provide a signal level in the laminations 14 which best produces very loose coupling between the signal source coil 16 and the detector coil 17, and thereby maximum Q at the detector coil 17.

The oscillator 20 is operative at 2,000 cycles, and applies approximately 50% of the positive voltage on the supply conductor 37 as an AC signal to the buffer circuit 22 and signal source coil 16. A small portion of the signal applied across signal source coil 16 is transferred to the detector coil 17, which, being resonant, produces a large voltage gain for sampling by a signal converter 24, and conversion to a DC level output to conductor 27 and the common control circuit 11. The use of a standardized voltage level output from the heads substantially minimizes the effects of electrical interference from adjacent electrical conductors, and as a result the common control circuit 11 may be located at long distances from the sensor units 10 (as far as 500' for example) without effecting the reliability of operation. This is a new and novel concept in proximity sensor devices, and is important to the provision of a unit which is flexible in its application in the field.

With reference to FIGURE 2, the common control circuit 11 is shown to comprise a level detector 26 which is basically comprised of a Schmitt trigger circuit supplied by a variable B+ section 28. The output of the level detector 26 is provided over conductor 29 to first and second time delay circuits 30, 31 which are operative to provide adjustable time delays into the stop and restart control functions in a novel manner to be more fully described hereinafter. The signal output from the time delay circuits 30, 31 is coupled over conductor 31' to the load relay 32 which includes control sets 32a, 32b, 32c, 32d for providing desired control functions of associated operating equipment as will be shown.

SPECIFIC DESCRIPTION OF SYSTEM

(a) Sensor unit

With reference once more to FIGURE 1, the signal source coil 16 on the sensing head 12 is as described above, energized by the supply circuit including oscillator circuit 20, and buffer circuit 22. Oscillator circuit 20 includes a transistor 47 having an emitter connected over resistor 59 and capacitor 60 to ground, a base connected to the output of a second transistor 53, and a collector for extending the amplified output of the oscillator circuit 20 to the buffer circuit 22. The collector of transistor 47 is also connected back over a twin T network 48 in a feedback circuit arrangement to the base of transistor 53. The collector of oscillator 53 is connected to the positive conductor 37 of the voltage regulator supply 34 (FIGURE 2) and the emitter is connected over resistor 54 to ground, and also over coupling capacitor 55 and divider network 57, 58 to the base of transistor 47. The twin T network 48 includes a lower T comprised of resistors 49, 50 and capacitor 56 connected between the juncture thereof and ground; and an upper T network consisting of capacitors 51, 52 and a resistor 61 connected between the junction thereof and ground. Transistor 53 is thus connected as an emitter follower to build up the base impedance of transistor 47. The signal output of transistor 47 is applied through the twin T network 48 to the base of transistor 53 and is phase shifted to an angle necessary to sustain oscillation of transistor 47.

The oscillating frequency of transistor 47 is determined by the twin T network 48 and will occur at a point where the phase angle of the lower T consisting of resistors 49, 50 and capacitor 56 and the base capacitance of transistor 53 is equal to the phase angle of the upper T network consisting of capacitors 51, 52, resistor 61 and the base resistance of transistor 53.

When a positive voltage is applied over conductor 37 to the collectors of transistors 47, 53 in the oscillator 20, the oscillator circuit operates at 2,000 cycle frequency, and applies approximately 50% of the positive voltage as an AC signal to the emitter follower 63 and over level adjustment potentiometer 23 to the LC circuit including coil 16 and capacitor 18. It has been found that for a practical size coil an oscillator frequency in the order of 400 cycles or larger is necessary to achieve a sensor which detects metal objects, and particularly non-ferrous objects, by the current conductive technique of the present disclosure.

Oscillator 20 holds the AC voltage and frequency to a tolerance of 1% as long as the positive voltage input over conductors 37, 39 is stable. The potentiometer 61 is used to adjust the frequency of oscillator 20 to the center frequency of the detector coil 17. The potentiometer 23 connected in the output of the emitter follower 63 is used to adjust the signal output to a standard level whereby more than one sensor unit may be used in series-parallel combinations with one common control circuit 11.

In the absence of a metal object, such as a metal can adjacent the sensor head 12, a small portion of the AC signal applied to the signal source coil 16 is transferred to the detector coil 17 which, being resonant, produces a large voltage gain which is changed to a DC level by the signal converter 24. When a constainer such as a can or a metal mass, ferrous or non-ferrous, is placed in close proximity to the face of the sensor head 12, the output of the detector coil 17 drops in proportion to the electrical conductivity and mass of the metal container. The alternating magnetic field in the laminations 14 is transferred to the object (container) in front of the sensor head 12 and produces a current in the object which is 180° out of phase with the current in the laminates 14 of the sensor head 12. The current produced in the container or object which is out of phase with the current in the lamination 14 results in opposing fields and loss of transfer efficiency of the power between the signal source coil 16 and the detector coil 17. It will be apparent therefore that the signal change provided in the detector coil has a direct relationship to the conductivity of the object. The magnetic properties of the material do not constitute a significant factor in the operation of the system.

If the mass of the object and the relative distances of the object from the sensor coils are equal, the greatest change will be achieved by the following metals in the order listed:

(1) Silver
(2) Copper
(3) Gold
(4) Aluminum
(5) Magnesium
(6) Tungsten
(7) Zinc
(8) Brass
(9) Cadmium
(10) Bronze
(11) Nickel
(12) Iron The ratio of change between silver, the first metal on the list, and iron, the last listed metal, is 6:1. Superconductive metals are not included in the foregoing example. By way of further example, a silver coin, such as a ten cent piece, will produce a change equal to a three ounce tin plate can.

With no container adjacent the sensor head 12, the output of the detector coil 17 is a voltage gain of high level, and with the presence of a container adjacent the sensor head 12 of output is a voltage gain of correspondingly reduced value. The output voltage gain is changed to a DC level (a relatively large level with the absence of a container, and a substantially lower level with the presence of a container) by signal converter 24.

More specifically, transistor 65 in the signal converter circuit 24 is connected as an emitter follower detector to prevent loading of the detector coil 17 while yet providing a voltage gain across the network including resistors 66, 67 and thermistors 68, 69 which are connected in the emitter circuit thereof. It will be apparent that the detector coil 17 is floating, whereby a larger gain is obtained to minimize signal to noise level problems. The collector of transistor 65 is connected to the positive supply conductor 37, and the base is connected to the output of the LC circuit including detector coil 17 and capacitor 19. The lower end of the LC circuit is connected to the junction of resistors 66, 67 and over capacitor 46 to power supply conductor 39. Thermistors 68, 69 are included in the circuit to provide stable operation for the unit as exposed to environments in which more severe temperature changes are experienced.

The signal output from the emitter of transistor 65 is supplied over resistors 66–69 and fed over the filter network comprised of resistors 70, 72, and capacitor 74, to reduce any ripple effect in the output signal. The filtered signal is fed to the base of a second emitter follower transistor 76. Transistor 76 has a collector connected to the positive potential supply load 37, and an emitter connected to provide a signal output over resistor network 78, 80 to output conductor 27. Transistor 76 changes the relatively high impedance of the filtering network 70, 72, 74 to a very low impedance for the output circuit to the common control circuit 11 (FIG. 2) to thereby reduce the effect of electrical interference from current carrying conductors which may be run in the same wiring trough which extends between the sensor unit 10 and the common control circuit 11.

COMMON CONTROL CIRCUIT 11

(a) Level detector 26

With reference now to FIGURE 2, it will be recalled that the common control circuit 11 there shown comprises a level detector 26 including a Schmitt trigger circuit, a variable B+ section 28, time delay circuit 30, 31 and a load relay 32.

The level detector 26 includes an NPN transistor 84 having a base element connected over resistor 83 to the output of the sensor unit 10 and over capacitor 85 to ground; a collector connected over resistor 86 to the output of the variable B+ section 28 to be described, and over resistor 89 to the base element of transistor 91, and an emitter connected over resistor 93 to ground. Resistor 83 and capacitor 85 are added to protect transistor 84 from electrical spikes which may be introduced into the input conductor 27 by electrical wiring which may be adjacent the run of conductor 27 prior to its connection of the common control circuit 11.

Transistor 91 is an NPN transistor connected with transistor 84 to provide an on-off switch in the level detector and includes an emitter connected common with the emitter of transistor 84 over resistor 93 to ground, a base connected over resistor 90 to ground and also to the collector output of transistor 84, and a collector connected over resistor 92 to the variable B+, and over resistor 94 to the base of a PNP transistor 96 which is connected as a voltage amplifier for signal output of the transistors 84, 91.

The variable B+ section 28 which provides a means of adjusting the effective level of detection by the detector circuit 26 includes a transistor 88 connected as an emitter follower, the collector thereof being connected to the B+ source conductor 37 for the system, the base being connected over the voltage divider circuit 87 which is connected between B+ conductor 37 and ground, and the emitter being connected to provide the adjusted stable B+ to the collectors of transistors 84, 91 96 of the level detector circuit 26.

When the output signal received from a sensor unit, such as 10, over conductor 27 is at the maximum level, the potentiometer 87 is adjusted so that the transistor 84 just operates to the "on" state. With such setting the transistors operate as a pair of on-off switches to detect level changes. With the maximum level signal on conductor 27 from a sensor unit 10, transistor 84 operates to the "on" state, and the resultant negative-going signal at the collector of transistor 84 is applied to the base of transistor 91 which turns off. The resultant negative-going signal which appears at the emitter of transistor 91 is applied back to the emitter of transistor 84, which is connected common therewith, to further turn on the transistor 84. If transistor 84 turns off, transistor 91 turns on in a similar pattern. Each of the transistors 84, 91 in operating thus turns full on or full off.

(b) Timing circuits 30, 31

The signals appearing at the collector of transistor 91 in its operation to the different conditions for different signal levels output from the sensor unit 10 controls the third transistor 96 (PNP) in the level detector 26 to provide signals to the time delay circuit 30, 31. Briefly, as transistor 84 turns off and transistor 91 turns on, the negative signal at the collector of transistor 91 turns off transistor 96, and the resultant negative signal over conductor 29 turns off the control transistor 97 for the timer circuit 30, 31. As will be shown hereinafter, such condition starts a timing operation by time delay circuit 30 prior to stopping of the associated equipment.

With a reduced signal level output from the sensor 10, transistor 84 turns off, and tnansistors 91 and 96 turn on to provide a positive signal to control transistor 97 to turn on and complete an energizing circuit for an indicator lamp 120' (power supply 34, resistor 122, lamp 120', transistor 97 to ground). In addition diode 98 conducts to discharge capacitor 99 and to initiate a timing operation by time delay circuit 31 prior to "restart" of the associated equipment.

More specifically, the first RC timing circuit 30 controlled by transistor 97 includes a resistor network 100, 101 and capacitor 99. A group of transistors including transistor 102 connected to operate in a Zener mode, and transistors 103, 106 which control the timing operations of a second RC circuit 31 which includes a capacitor 109 and resistors 110, 111. Briefly, the emitter of transistor 102 is connected to the junction of resistor 100 and capacitor 99, the collector is floating, and the base is connected to the base of transistor 103. Transistor 103 is connected as an emitter follower with the collector of transistor 103 being connected over resistor 104 to positive supply conductor 37, and the emitter being connected over resistor 105 to ground and to the base of transistor 106. The emitter of transistor 106 is connected to ground, and the collector is connected to the junction of resistor 110 and capacitor 109.

Transistor 107 controlled by the second RC circuit to operate in a Zener mode, in turn, controls transistors 108, 112 in the operation of load relay 32. Thus the emitter of transistor 107 is connected to the junction of resistor 110 and capacitor 109, the collector is floating and the base is connected to the base of transistor 108. The collector of transistor 108 is connected over resistor 115 to positive supply conductor 37, and the emitter is connected over resistor 114 to ground and the base of transistor 112. The emitter of transistor 112 is connected to ground and the collector 112 is connected over conductor 31' to load relay 32. Transistor 112 thus operates as a driver transistor for the load relay 32. As will be shown, the Zener effect achieved by reverse biasing of the base emitter circuit of transistor 102, 107 permits a time constant of approximately 50% to be obtained in the RC circuits 30, 31.

The energizing circuit for the load relay 32 extends from ground over transistor 112, conductor 31', the winding of load relay 32 to positive potential in the voltage regulator power supply 34. A diode 113 is connected across the coil of load relay 32 to eliminate electrical spikes from damaging transistor 112.

Load relay 32 has a set of contacts 32a–32d which may be connected to control the energizing circuits for associated equipment. Thus in a conveyor system for metal containers, the load relay contacts may be converted to control the electric motors which provide the drive for the conveyor unit, and the energizing circuit for indicator lamps. Other possible uses and applications will be readily apparent.

The voltage regulator power supply 34 basically comprises a diode bridge rectifier 120 and filter capacitor 122' connected across a 110 volt AC power line by an AC transformer 35. The direct current output of the bridge rectifier 120 is fed to a series voltage regulator comprising transistors 124 and 126 and Zener diode 127 which effect the provision of the constant output voltage over current limiting resistor 129 to the positive conductor 37 and ground conductor 39 for the system.

SYSTEM OPERATION (a) Void detection

As was indicated hereinbefore, the flexibility of the novel system permits use thereof to provide a number of different forms of functional control including, by way of example, void detection, line limit proximity control and proximity motion control.

In a typical example of void detection, the sensor units 10 may be installed at the desired locations along a conveyor line at which monitoring of metal cans on the conveyor line is desired. With normal operation, the cans will move past the sensor units, and the continued presence of the cans will cause the sensor unit to maintain the associated equipment energized. However, if a void occurs adjacent the sensor unit for a predetermined period of time, which period of time is predetermined by the setting on the adjustable resistors 100 and 110, as will be shown, the sensor unit 10 will provide a signal to the common control circuit 11 to cause load relay 32 to stop the associated equipment. At such time as the fault has been corrected and the void closed by a can, a further predetermined time interval, the length of which is determined by the setting of adjustable resistor 101, will be measured prior to reoperation of the load relay 32 and the associated equipment.

As noted above, the control circuit 11 is connected to complete an energizing circuit for load relay 32 for normal can movement (minimum signal from the sensor unit 10), and at such time as a void occurs, the control circuit 11 measures the predetermined delay period, and then restores the load relay 32 to interrupt the energizing circuit to the associated equipment. Such manner of control of load relay 32 is preferred since any power loss for the control system will automatically result in restoration of load relay 32 and disablement of the associated equipment. The circuit operation for a void detection system is now more specifically set forth.

During the period that the cans move past the sensor head 12, the reduced signal level output from the sensor unit 10 over conductor 27 will result, as described earlier, in transistor 84 being turned off, transistors 91, 96 being turned on, and control transistor 97 for the timing circuits 31, 32 being turned on. As a result, capacitor 99 is shunted by the transistor 97, and the upper plate of capacitor 99 will be substantially at ground. The more negative signal appearing at the upper plate of capacitor 99 back biasses transistor 102 and transistor 103 is turned off. The negative signal on the collector of transistor 103 turns off transistor 106 and capacitor 109 is charged to a positive value, the charging circuit extending from positive conductor 37 over resistors 110, 111 and capacitor 109 to ground. As a result of the positive voltage on capacitor 109, transistor 107 is forward biassed and transistor 108 is on. The positive voltage at the emitter of transistor 108 turns on transistor 112 to complete the energizing circuit for the load relay 32. Load relay 32 as energized is effective at its contacts 32a, 32c to complete an energizing circuit for the associated equipment. Such condition is maintained for the period that the sensor unit 10 detects the presence of cans adjacent thereto.

Assuming now that a void occurs between the cans which are passing adjacent the sensor unit 10, which void occurs for a time period greater than that preset on resistor 100 in the time delay circuit 30, the maximum level output signal provided by sensor unit 10 over conductor 27 to the common control circuit 11 will result in release of the load relay 32 and disablement of the associated equipment. Briefly, with receipt of the maximum level signal, transistor 84 turns on and transistors 91, 96 and 97 turn off. As control transistor 97 turns off, diode 98 no longer conducts, and a charging circuit is completed over resistor 100, 101 to capacitor 99. The upper plate of capacitor 99 charges in a positive direction and as a charge sufficient to forward bias transistor 102 is reached, transistor 103 will be turned on. The setting of the adjustable resistor 100 will therefore determine the length of time to reach such positive value, and accordingly the time period of void detection which must occur before the control circuit effects equipment shut down.

As a result of transistor 103 being turned on, transistor 106 turns on and the charging circuit for capacitor 109 is shunted over transistor 106. Capacitor 109 discharges over transistor 106, and the more negative potential which results back-biasses transistor 107 which turns off transistors 108, 112 to restore load relay 32. As load relay 32 restores, it is effective at its contacts 32a, 32c, to interrupt the energizing circuits for the associated equipment.

It will be apparent that in the described system the time interval of the void detection must be greater than the measured time interval determined by setting of potentiometer 100 in the time delay circuit 30. If the period of void detection is less than such measured period, control transistor 97 will be turned on to terminate the timing period, and thereby maintain the load relay 32 in its energized condition.

Assuming now that the void detection occurred which was sufficient to stop the associated equipment, and that the sensor unit 10 once again detects the presence of a container, the reduced signal input over conductor 27 from sensor unit 10 to transistor 84 in the common control circuit 11 results in cutoff of transistor 84. Transistors 91, 96 and 97 turn on to discharge capacitor 99 in the first timing circuit 30, and thereby back-bias transistor 102 to turn off transistors 103, 106 and thereby establish the charging circuit for capacitor 109. As capacitor 109 charges to the value at which transistor 107 is forward biassed (the period of such charging being determined by the setting on resistor 110) transistors 107, 108, 112 turn on to reestablish the energizing circuit for load relay 32. It will be apparent therefrom that a measured delay period determined by the setting of arm 110 must occur prior to turning on of the associated equipment by load relay 32 after detection of a void. Thus both stop and restart have measured time delays.

(b) Line limit proximity control

The same sensor unit 10, and fundamentally the same common control circuit, may also be used for the purpose of providing a line limit control for conveyors or can lines. In such use, the monitoring of the line consists of detecting variations in the spacing between the containers while passing the sensor unit 10. That is, the containers are normally expected to pass the sensor with predetermined spacing therebetween. When motion of the cans past the sensor unit 10 stops, or should the space between the successive cans decrease to the point where the cans are too close to each other (the selection of the spacing may be adjusted by means of the potentiometer 100, as will be shown) and the load relay 32 will be disabled to stop the associated equipment.

In the use of the system for line limit proximity control, an extra stage is added for the purpose of maintaining the proper phase relation of the delay system, and particularly to adjust the phase of the trigger circuit in level detector 26 through 180° before applying the output signal to the control transistor 97. Such stage is shown in FIGURE 4 and as there shown merely requires removal of the wire X in FIGURE 2 and connection of the points marked A, B and C in FIGURE 4 to the points marked A, B, C in FIGURE 2.

Assuming now that the cans are moving past the sensor in the proper manner (with the predetermined spacing existing between the cans) it will be apparent that the signal output from the sensor unit 10 during the void periods detected will be at a maximum level. With the maximum level signal on conductor 27 to the common control circuit 11, transistor 84 will be turned on and transistors 91, 96 and 132 will be turned off. Transistor 97 will be turned on whereby capacitor 99 is discharged, and the transistor 102 is back-biassed to turn off transistors 103 and 106. Capacitor 109 will be charged to a more positive value, and transistor 107 is forward-biassed so that transistors 108 and 112 are turned on to complete an energizing circuit for the load relay 32 which at its contacts 32a, 32c completes an energizing circuit for the associated equipment.

Assuming now that during the operation of the system, a can stops (or the spacing between the cans decreases to a value which in time is less than the time interval set on the adjustable resistance 100), the system will release load relay 32 to stop the associated equipment. More specifically, with stopping of a can in front of the sensor unit 10, the resultant low level output signal over conductor 27 turns off transistor 84 to turn on transistors 91, 96 and 132. Control transistor 97 turns off and capacitor 99 will begin to charge at a rate determined by the setting of the adjustable resistance 100.

At such time as the capacitor 99 is charged to the forward biassing valve for transistor 102, transistor 103 and 106 turn on, and capacitor 109 is immediately discharged to back-bias transistor 107 which turns off transistors 108, 112 which disable load relay 32, whereby contacts 32a, 32c are opened and the associated equipment is brought to a halt. It is apparent that if the cans are sufficiently close to one another, the drop in signal level provided by sensor unit 10 on conductor 27 will be maintained so that it appears that a can is stopped in front of the sensor. The control circuit will thereupon effect restoration of the load relay 32 and stopping the equipment in a like manner.

Assuming now that the can has been removed from its position adjacent the sensor unit 10 (or that the period between successive cans has lengthened) the signal on the conductor 27 will be increased to the maximum level, and after a predetermined time period determined by the setting of resistor 110 in the second timing circuit the associated equipment will be automatically reenergized.

More specifically, with the receipt of the maximum level signal on conductor 27 from the sensor unit 110, transistor 84 will turn on, transistor 91 and 96, 132 will turn off, transistor 97 will turn on to discharge capacitor 99 immediately. As a result transistor 102 will be back-biassed, and transistors 103 and 106 will be turned off to complete a charging circuit for capacitor 109. After a period of time determined by the setting of adjustable resistor 110, transistor 107 will be forward-biassed and the transistors 108, 112 will conduct to complete the energizing circuit for load relay 32 and thereby effect the closure of contacts 32a, 32c to operate the associated equipment once more.

(c) Proximity motion control

According to a further embodiment of the novel system, the novel sensor unit may be used with conveyor systems in which cans are moved past the sensor system in back-to-back relation, and when a can is brought to rest in front of the sensor unit as the result of a conveyor fault, the system will automatically effect stopping of the associated equipment. In such embodiment additional sensor 134 is added to the system, such sensor, as shown in FIGURE 3, being connected at points X, W, Y, Z in FIGURE 1. The sensor 134 basically comprises a very low frequency alternating current amplifier which derives a signal form the junction of resistors 66, 67 and amplifiers a fast level change such as is caused by the passage of an object in front of the sensor head 12. The fast level change is amplified to full peak-to-peak voltage and applied over capacitor 141 to the base of transistor 76 to provide a maximum level signal each time a can passes the sensor and thereby reset of the first time delay circuit.

It will be seen that as long as the pulses are received so that each pulse effects reset of the timing device prior to completion of the timeout cycle provided by the first timing circuit 30, the load relay 32 will be maintained operated and the associated equipment will be energized.

More specifically, as the first pulse is provided output from the sensor unit 10 responsive to the first object passing sensor head 12, a maximum level signal on conductor 27 will result in transistor 84 being turned on, transistors 91, 96, 132 being turned off, transistor 97 on the capacitor 99 discharged. Back-biassed transistor 102 will turn off transistors 103, 106, and capacitor 109 will be charged whereby transistor 107 will be forward-biassed and transistors 108, 112 will be on to enable the load relay 32.

During the subsequent brief interval during which no pulse is received, transistor 84 will turn off and transistors 91, 95, 132 turn on and transistor 97 turns off to start a timing cycle by timing circuit 30. The capacitor 99 begins to charge and if a pulse is not received sufficiently early as the result of the passage of the subsequent can (i.e., before the timing period set up in the RC circuit by adjustable resistance 100) transistor 102 will be forward biassed, transistors 103 and 106 will turn on, transistor 107 will be back-biassed, transistors 108, 112 will release load relay 32 to turn off the equipment. However, assuming that the subsequent pulse is received prior to the expiration of such timing period, the maximum value signal on conductor 27 will cause transistors 84 to turn back on and transistors 91, 96, 132 to turn off whereby transistor 97 turns on to discharge capacitor 99 before it reaches the value at which transistor 102 would initiate the shutoff operation. The timing circuit 30 is thus reset by each pulse and starts a new timing cycle thereafter.

Although only certain particular embodiments of the invention have been shown and described, it is apparent that modifications and alterations may be made therein, and it is intended in the appended claims to cover all such modifications and alterations as may fall within the true spirit and scope of the invention.

What is claimed is:

1. A sensing system for use in the detection of metal current-conducting objects comprising sensor means including an oscillator circuit, a core member having a first and a second section joined by an intermediate section, a driven signal coil mounted on said first section of said core member driven by said oscillator circuit, and a detector coil mounted on said second section of said core member to resonate at the operating frequency of said signal coil, output means connected to said detector coil operative to provide alternating current signals of a first value in the absence of an object in the proximity of said core member, and alternating current signals of a second value responsive to movement of a current-conducting metal object adjacent thereto, signal converter means for changing said alternating current signals of different values to correspondingly different DC levels, a common control circuit including a signal level detector means for detecting the direct current level of the signals output from said signal converter means, timer means controlled by said signal level detector means whenever a predetermined DC level is detected to start measurement of a timed period, and function control means operative in response to completion of a preset timing measurement by said timing circuit.

2. A system as set forth in claim 1 in which said timer means includes a first and a second timing circuit, and in which said function control means are operative to effect shutdown of associated equipment only after a measured time period by said first timing circuit, and to effect restart of associated equipment only after a measured time period by said second timing circuit.

3. A sensing system for use in the detection of current-conducting objects which move past a position with substantially no spacing therebetween comprising sensor means at said position operative to provide alternating current signals of a first value in the absence of a current-conducting object adjacent thereto, and alternating current signals of a second value responsive to the presence of a current conducting object adjacent thereto, pulse means for providing a pulse output at the frequency of movement of the objects therepast, control means responsive to said pulse signals including a timing circuit for initiating a timing period responsive to a decrease in said pulse frequency below a predetermined value, and function control means operative in response to completion of the timing measurement by said timing circuit.

4. A sensing system as set forth in claim 3 which includes a signal converter means connected to said sensor means to provide direct current signals at a first level responsive to the absence of motion of an object past said sensor means and the receipt of alternating current signals of said first value from said sensor means, and to provide direct current signals at a second level responsive to absence of motion and the receipt of alternating current signals of said second value from said sensor means.

5. A sensing system for use in the detection of current-conducting objects in a material handling system comprising sensor means including an oscillator circuit, a core member having a first and a second section joined by an intermediate section, a drive signal coil mounted on said first section of said core member driven by said oscillator circuit, and a detector coil mounted on said second section of said core timer to resonate at the operating frequency of said signal coil, output means connected to said detector coil operative to provide signals of a first value in the absence of one of said objects, and signals of a second value responsive to movement of a current-conducting metal object adjacent thereto, a control circuit connected to said output means including a signal level detector means comprising a semiconductor switch which is operable at only two stable states, said level detector means being operative to one stable state responsive to said signals of said first value, and being operative to the second stable state responsive to said signals of said second value, timing means for measuring a first predetermined period responsive to operation of said signal level detector means to one of said states, and function control means operative from a first condition to a second condition in response to completion of the timing measurement by said timing means.

6. A system as set forth in claim 5 in which said material handling system moves said objects past said sensor means at a given spacing, and said timing means is set to operate said function control means responsive to signals from said sensor means indicating a spacing in time greater than said predetermined spacing.

7. A system as set forth in claim 5 in which said sensor means is operative to provide pulse signals to said control circuit with each movement of one of said objects therepast, and in which said timing means operates said function control means responsive to the occurrence of a time period between said pulse signals which is greater than a pre-set value.

8. A system as set forth in claim 5 in which said timing means is set to operate said function control means responsive to presence of one of said objects adjacent said sensor means for a period longer than the period measured by said timing means.

9. A sensing system for use in the detection of current-conducting objects comprising a plurality of sensor means each of which has means for providing direct current signals at a first level in the absence of an object, and direct current signals of a second level responsive to movement of a current-conducting metal object adjacent thereto, a common control circuit connected to said plurality of sensor means including a timing circuit for measuring a predetermined period, a signal level detector means for detecting the level of said direct current signals including means for initiating a timing measurement by said timer means responsive to a direct current signal level of one of said values from said sensor means, and function control means operative from a first condition to a second condition in response to completion of the timing measurement by the timer circuit.

10. A system as set forth in claim 9 which includes means for connecting a plurality of said sensor means in series to control the direct current signals output to said common control circuit.

11. A system as set forth in claim 9 which includes means for connecting a plurality of said sensor means in parallel to control the direct current signals output to said common control circuit.

12. A system as set forth in claim 9 which includes means for connecting a plurality of said sensor means in a series and parallel combination circuit to control the direct current signal output to said common control circuit.

13. In a sensing system for use in detection of current conducting objects, an integral sensor unit including a sensor head comprising a core member having a first and a second section joined by an intermediate section, a driven signal coil mounted on said first section of said core member, an oscillator circuit connected to drive said signal coil at a predetermined frequency, a detector coil mounted on said second section of said core member tuned to resonate at the operating frequency of said signal coil, output means connected to said detector coil operative to provide alternating current signals of a first value in the absence of an object adjacent said core member and alternating current signals of a second value responsive to movement of a current-conducting metal object adjacent thereto, and signal converter means in said unit connected to convert the alternating current signals of said different output values from said detector coil to direct current signals of correspondingly different levels, and means for extending the direct current signals output from said unit to functional equipment located remotely from the integral sensor unit.

14. A sensing system as set forth in claim 13 which includes pulse generator means mounted in said integral sensor unit for modifying the signal output of said signal converter circuit to a pulse output at the frequency of motion of said object past said sensor unit.

15. A sensing system for use in the detection of current-conducting objects comprising sensor means including a sensor head comprising a core member having a first leg and a second leg joined by an intermediate section, a driven signal coil mounted on said first leg and a detector coil mounted on said second leg, said detector coil being tuned to resonate at the operating frequency of said signal coil, said sensor head being operative to provide alternating current signals of a first value in the absence of a current conducting object adjacent thereto, and alternating current signals of a second value responsive to the presence of a current-conducting object adjacent thereto, signal converter means for changing said alternating current signals of different values to direct current signal levels of correspondingly different values, control means responsive to different levels of direct current signals including a timing circuit for initiating a timing period responsive, at least, to a change of signal output from one level to another level, and function control means operative in response to completion of the timing measurement by said timing circuit.

16. A sensing system as set forth in claim 15 in which said sensor means includes an oscillator circuit for driving said signal coil at a predetermined frequency, and in which said detector coil is resonated at the oscillator frequency.

References Cited

UNITED STATES PATENTS

| | | | |
|---|---|---|---|
| 2,844,781 | 7/1958 | Adelman | 317—142 |
| 3,011,101 | 11/1961 | Boyce | 317—142 |
| 3,077,164 | 2/1963 | Da Roza | 317—142 |
| 3,147,408 | 9/1964 | Yamamoto | 317—146 |

JOHN F. COUCH, Primary Examiner

DENNIS HARNISH, Assistant Examiner

U.S. Cl. X.R.

328—5